June 27, 1967 F. W. MEECE ETAL 3,327,745
TREE CUTTER DEVICE
Filed Oct. 5, 1966 3 Sheets-Sheet 1

INVENTORS
Fred W. Meece &
Frank B. Dew

INVENTORS
Fred W. Meece &
Frank B. Dew

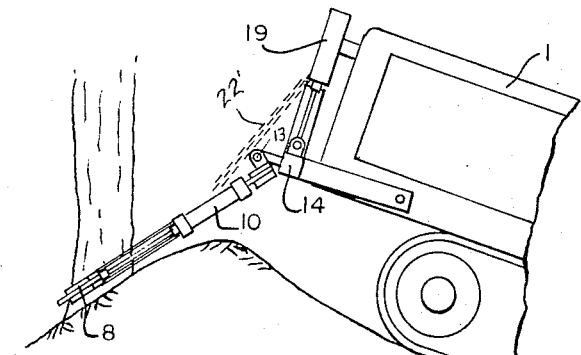
FIG. 7.
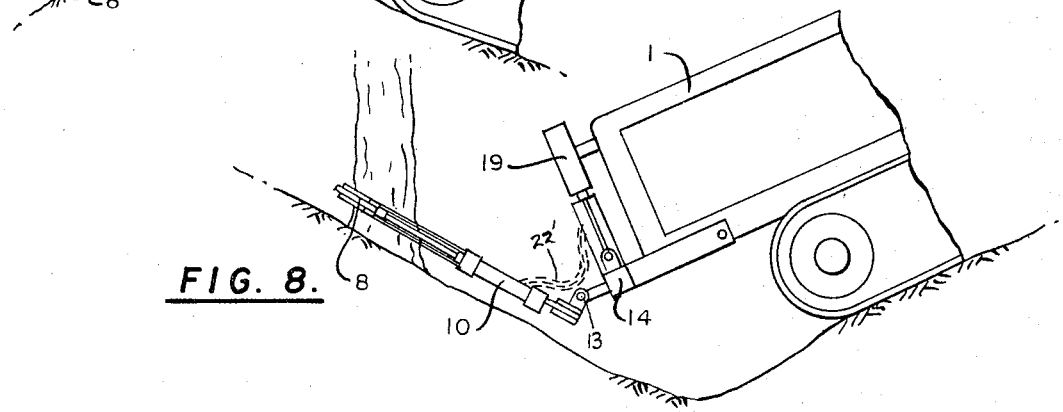
FIG. 8.
FIG. 6.
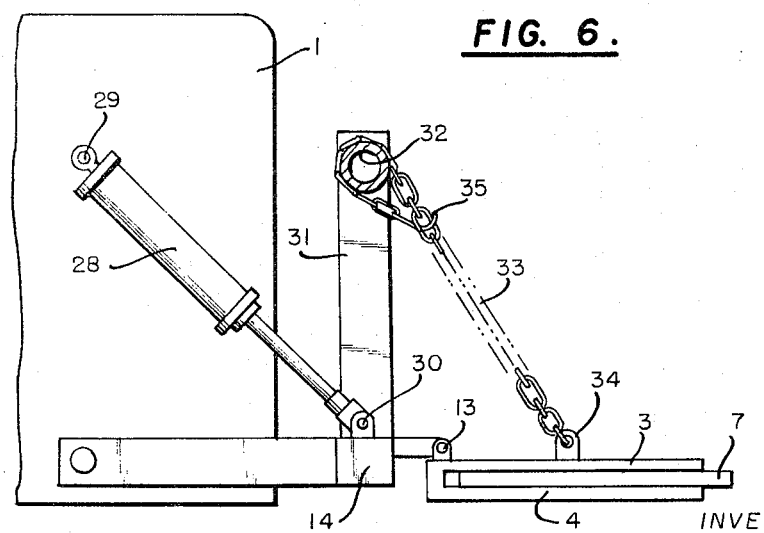
INVENTORS
Fred W. Meece &
Frank B. Dew

United States Patent Office 3,327,745
Patented June 27, 1967

3,327,745
TREE CUTTER DEVICE
Fred W. Meece, Washington, and Frank B. Dew, Plymouth, N.C., assignors to Harrington Manufacturing Company, Lewiston, N.C., a company of North Carolina
Filed Oct. 5, 1966, Ser. No. 584,516
10 Claims. (Cl. 144—34)

The lumber and pulpwood industries require large quantities of logs each day in order to maintain continuous operation. At one time all of these logs were supplied by crews of men with axes and saws working their way through a tract of woodland. Within the last twenty years, chain saws operated by small gasoline motors were introduced and this greatly reduced the actual physical labor involved in felling a tree. Although a great number of chain saws are still in use by lumbermen, the diminishing supply of labor and its increasing cost have forced the lumber and pulpwood industries to look for other means for felling trees at less cost and greater speed. The trend now clearly seems to be toward cutting devices mounted on tractors or other vehicles, and powered by one or more hydraulic pistons. One such tractor-mounted cutting device can do the work of many men equipped with chain saws. The following patents are representative of those that have issued since 1940 on tree cutting devices mounted on tractors or similar vehicles: 2,214,334, 2,228,635, 2,493,696, 2,529,934, 2,565,252, 2,697,459, 2,751,943, 2,820,493, 2,845,101, 2,876,816, 2,955,631, 2,981,301, 3,059,677, 3,122,184, 3,183,949, 3,183,952, 3,183,953, 3,183,954, 3,196,726, 3,196,911, and 3,230,988.

Devices of the above type have the advantage that (a) the tractor can move through heavy underbrush more quickly and easily than men with chain saws, (b) tree felling is less at the mercy of unfavorable weather and soil conditions, (c) the comparatively delicate and erratic performance of chain saws is avoided, and (d) the movement of the tractor through a wooded area in the normal course of its tree felling operations automatically smooths the way for subsequent log removing operations by crushing down the heavy underbrush which often surrounds the trees.

Since the basic idea of mounting hydraulically driven shears on a tractor and using it to cut down trees is now about thirty years old (see Knight Patent 2,214,334), the inventors in this field have primarily directed their attention toward solving certain problems associated with this basic operation.

One problem which has not been solved thus far is the problem of being able to cut trees so that the stump will follow the contour of the ground when the tree is on an uphill slope or on a downhill slope. This problem has probably escaped the attention of many inventors because so many logging operations are carried out on essentially level ground. However, the problem is an important one since with the increasing use of wheeled or tracked vehicles to remove logs after they are felled, every precaution must be taken not to leave stumps that will obstruct or disable the wheels or tracks of such vehicles. When the wheel or track of a log hauling vehicle is disabled by a protruding stump, the entire logging operation is often halted, which is both expensive and wasteful of machines and manpower.

Furthermore, even ground which seems to be quite level, is not really level insofar as a tractor is concerned because the presence of fallen trees, stump holes, old stumps and heavy brush in the area where the tractor is to cut timber in effect makes the ground quite unlevel. In fact, due to the presence of fallen trees, stump holes, old stumps and heavy brush, the tractor is probably not level 50% of the time.

The present invention relates to an arrangement for use primarily on tractors whereby, through the use of fluid operated shears, it becomes possible to station the shears at any desired point near the lower part of a tree and thereafter operate the shears to cut through the trees at or very near the level of the ground so that the top surface of the remaining stump can be made substantially parallel to the ground regardless of the contour of the ground and regardless of the presence of fallen trees, stump holes, old stumps and heavy brush. The cutting device of this invention permits better adjustment of the cutting blades angle both before and during the cutting operation. Trees may be cut or sheared closer to the ground than by any other means. This results in more wood utilization and a better quality of wood.

When a tractor equipped with the tree-cutting device of this invention is also equipped with a heater or an air-conditioner, tree cutting work can be carried on during the entire year at peak efficiency, regardless of the weather, enabling an operator to cut many times as much, even in heavy underbrush, as his walking chain-saw-carrying counterpart. There is no need to postpone tree cutting operations until the underbrush is cleared out. The present invention takes most of the physical labor out of stumping and reduces the hazards of nature. It also permits a wider range of personnel to be used for the stumping work. A new operator can directionally fell trees with very little training. The fact that the present tree cutting device cuts stumps so close to the contour of the ground avoids the possibility that skidding and reseeding equipment which is later used over the cut area will be damaged by protruding stumps. The tree-cutting device of this invention delivers *many times* the production possible from a man with a chain saw.

A primary object of this invention is to provide a mounting for a timber shear device which is adjustable to position the blade of the timber shear device parallel to the ground, regardless of the slope of the ground.

A further object is to provide a timber shear device, which may be adjusted both as to the height and the slope of the ground.

Another object of this invention is to provide a cutting attachment of the type described which is suitable for ready mounting and removal from conventional tractor-type vehicles, such unit having blade elements to sever trees and guide elements to control the direction or fall of trees and eliminate or reduce the risk of damage to the vehicle or injury to its operator.

Still another object of this invention is to provide a cutter of the type described, which is simple in operation, economical of manufacture and sufficiently rugged to withstand the severe conditions resulting from its field of employment.

With the foregoing and and other objects in view, all of which will become clearer as the description proceeds, the invention consists of certain novel details of construction and combinations of parts hereinafter more fully described and pointed out in the claims, it being understood that changes may be made in construction and arrangement of the parts without departing from the spirit of the invention as claimed.

In the accompanying drawings preferred forms of the invention have been shown, in which.

Figure 1:
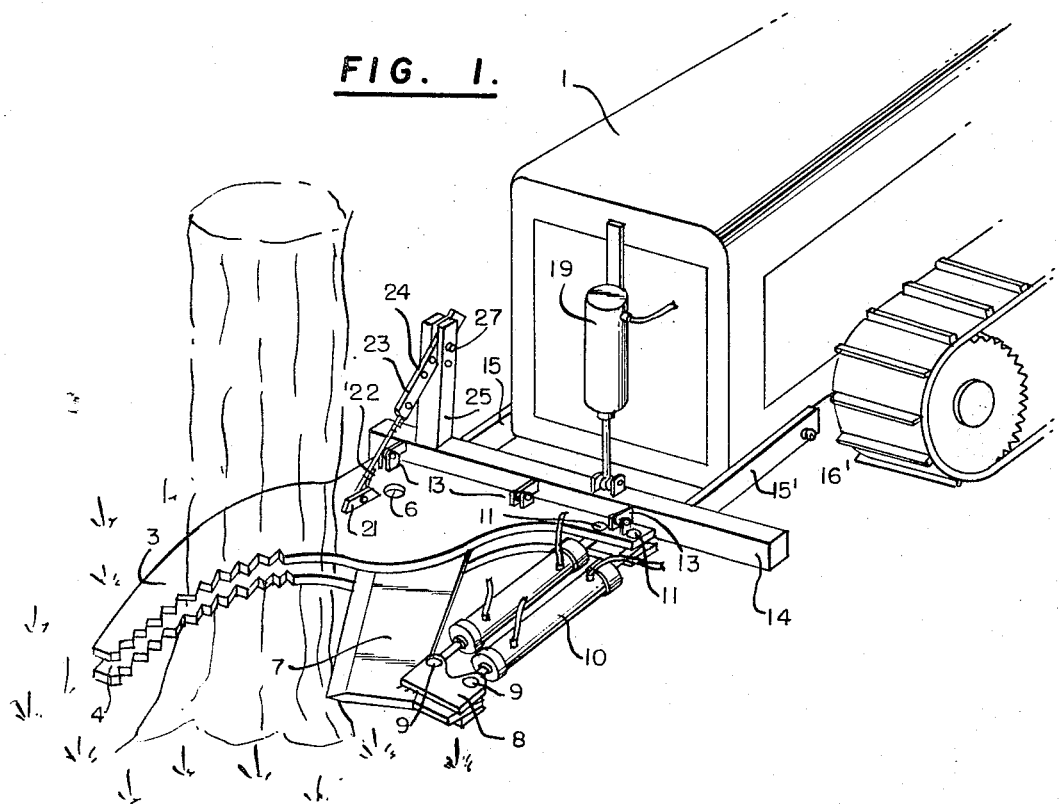
FIGURE 1 shows a perspective view of our improved timber shear mounting structure.
Figure 2:
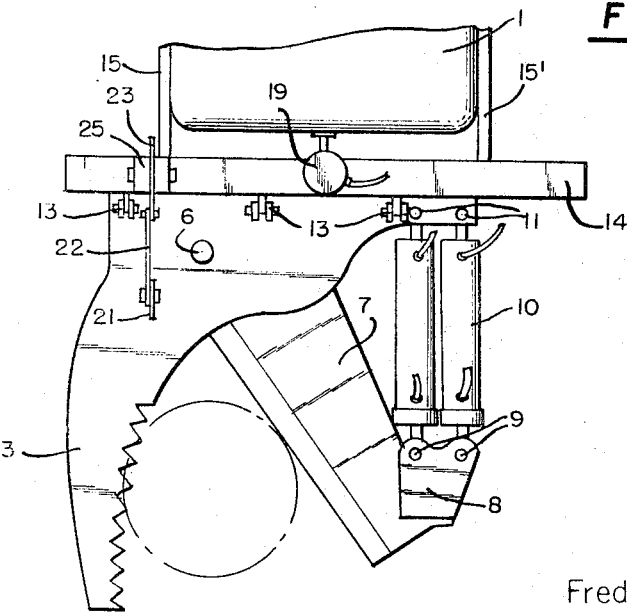
FIGURE 2 is a partial plan view thereof with the blade open.
Figure 3:
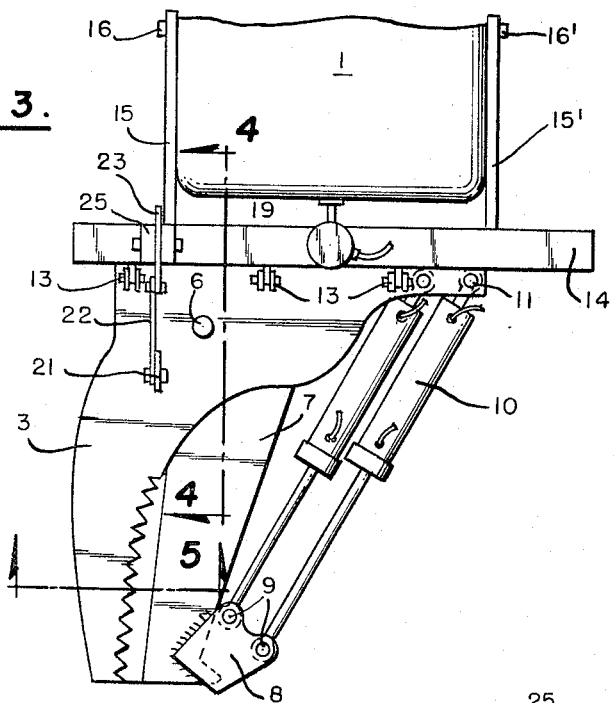
FIGURE 3 is a partial plan view thereof showing the blade closed.
Figure 4:
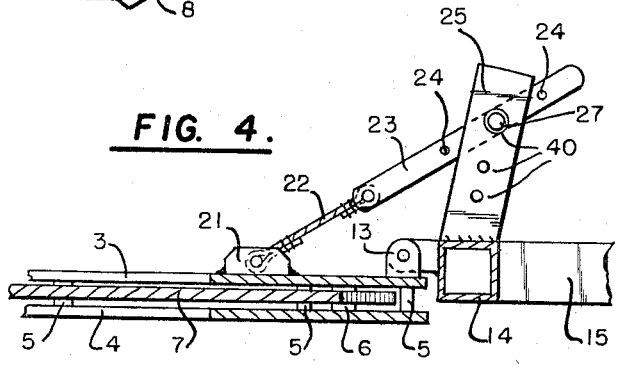
Figure 5:
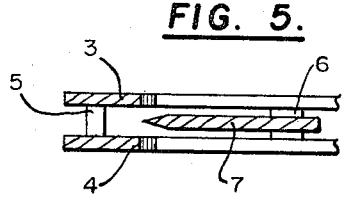

FIGURES 4 and 5 are side elevations along 4—4 and 5—5 respectively of FIGURE 3;

FIGURE 6 is a side elevation of another embodiment of the invention; and

FIGURES 7 and 8 are side elevations showing how the timber shear of this invention would work on inclined slopes.

Referring now more particularly to the drawings, wherein like numerals refer to like parts in the various views, 1 represents a conventional tractor upon which the timber shearing device of this invention is mounted.

The main element of the shearing device is an elongated blade member 7 that is preferably generally L-shaped in overall plan view, although the precise shape is not critical. One end of (i.e. the inner end) said blade member 7 is mounted on a pivot pin 6 so that the blade can be pivoted through a limited arc. The pivot pin 6 is securely fixed between two fixed jaw members 3 and 4 that may be considered as generally L-shaped. The jaw members 3 and 4 are preferably provided with teeth to assist in gripping the tree that is to be cut.

The jaw members 3 and 4 are disposed in a generally parallel relationship to each other and are held apart a fixed distance by one or more spacer means 5 of the type shown in FIGURES 4 and 5.

A pair of fluid operated cylinder and piston means 10 are shown pivotally connected to one end of the fixed jaw members 3 and 4 by means of pins 11 and also pivotally connected to an extension 8 welded on the outer end of the blade member 7 by means of pins 9. If desired, a single cylinder and piston means can be used rather than the two shown. In operation, the cylinder and piston means 10 (when supplied with fluid pressure) move the blade 7 toward and to a limited extent between fixed jaws 3 and 4 to thereby cut through a tree trunk.

Referring now to the support arrangement, it will be noted that two generally parallel supporting arms 15 and 15' have their front ends attached to a beam 14 at spaced apart points and the rear ends supporting arms 15 and 15' are adapted to be pivotably attached to suitable pivot points 16 and 16' located on the sides of vehicle 1.

A lifting means in the form of a hydraulic cylinder 19 is provided so that by having its upper end connected to the vehicle 1 and its lower end connected to the beam 14, the beam can be suitably raised or lowered. FIGURE 6 shows another arrangement wherein the beam 14 can be positioned at any desired level by a cylinder 28 mounted at an angle to the horizontal and which is secured by a bolt 29 to the side of the tractor body, and by pins 30 to the beam 14.

An important feature of novelty of this invention is the particular way in which the jaw members are connected to the beam 14. We have discovered that these jaw members should first of all be mounted for vertical pivotal movement with respect to the elongated horizontally disposed beam 14, preferably by means of a plurality of pivot members 13. In addition to said pivotal mounting, there should be a flexible interconnecting means between said jaw members and said beam 14, such flexible interconnecting means serving to establish the maximum arc through which the jaw members can freely move with respect to the beam 14.

One form of a suitable flexible interconnecting means is shown in FIGURES 1–5, and is seen to consist of an upstanding post member 25 located on beam 14, cable 22 and a bar 23 (having a plurality of holes 24 therein) that extend between post member 25, and a lug 21 located on the upper fixed jaw 3. The holes 24 in bar 23 and a series of holes 40 in post member 25 can be aligned and a bolt 27 inserted therethrough so as to establish the maximum extent to which the fixed jaws 3 and 4 can pivot about the beam 14.

FIGURE 6 shows another flexible interconnecting means comprising an upstanding post 31 located on beam 14 that has a tubular bar 32 extending therefrom. One end of chain 33 is connected to ear 34 on the upper jaw member 3, and at the other end is brought over the tubular member 32. The end of the chain has a hook 35 which may be connected to any desired link. The maximum extent to which jaw members may pivot with respect to the beam 14 may be adjusted by unhooking the chain at hook 35, setting the jaws to the desired position and then pulling the chain taut and hooking it.

With the above described arrangements, an operator usually first adjusts the level of the shear blade with respect to the ground by first supplying fluid pressure to cylinder 19 so as to raise or lower the beam 14 to the desired level. The operator then checks to make sure that the cable 22 (or chain 33) has enough slack in it so that that jaws and blade can rest either on the ground near the base of the tree or only a short distance above the ground and parallel to it. If the jaws and blade do not rest in the aforesaid desired positions, then the operator should adjust the cable or chain until there is sufficient slack to permit these positions. As a general rule, the operator can operate over a considerable portion of a wooded tract by providing sufficient slack so that the plane of the fixed jaws can drop freely to the position shown in FIGURE 7 (i.e. up to about 45°) or raise to about 45° as is shown in FIGURE 8.

It is thus seen that the blade is able to cut off a tree so that the surface of the remaining stump conforms to the contour of the ground and does not project above the ground to a sufficient degree to present an obstacle to the movement of other vehicles.

The aforesaid flexible interconnecting means of this invention not only permits the blade and jaws to follow the contour of woodlands with an undulating surface, but it also affords a measure of protection to the jaws and blade after the tree is cut and is falling. In other words, falling trees topple until the top of the tree hits the ground, but when the top of the tree hits the ground, the severed trunk portion often momentarily is fulcrumed into the air by virtue of the branches on the tree, and immediately thereafter the raised severed trunk portion comes slamming back down to earth again. More often than not, when the severed trunk slams down, it slams down on top of the jaws and the blade. If the jaws and blade were not pivotally and flexibly interconnected as we have described above, the force of the descending trunk could easily break the blade and/or jaws. Our arrangement provides some "give" so that even if the severed trunk slams down on the jaws and blade, this force is largely transmitted to or absorbed by the ground upon which the jaws and blade are resting by virtue of the pivotal connection to beam 14 and the flexible interconnecting means. Our invention is therefore quite valuable in that it has a built-in safety feature that reduces wear and tear on the timber shear and avoids many costly disablements of the machine that might otherwise occur.

FIGURES 7 and 8 illustrate more clearly how the present invention enables a timber shear to cut trees substantially parallel to the ground regardless of whether the tree is over the crest of a hill with respect to the tractor or across a small valley with respect to the tractor. (The blade 8 and piston 10 would usually be flat on the ground in actual practice, but for the purpose of clarity of illustration, the blade 8 and the piston 10 are shown raised slightly above the ground.) In FIGURE 7 the chain or cable 22' is shown as being slack and in FIGURE 8 taut. However, it would also be possible to have the chain or cable 22' slack in the FIGURE 7 arrangement and taut in the FIGURE 8 arrangement. Also, whereas a cable 22 has been shown in FIGURES 1–5, a chain 33 in FIGURE 6, and a chain or cable in FIGURES 7 and 8, the basic concept is that of having a means for varying the angle of the plane of the jaw members with respect to the beam 13. Consequently, no invention would be involved in replacing flexible cable 22 or chain 33 with an obvious equivalent, such as a hydraulic cylinder or in using a cable or chain in conjunction with a flexible cylinder or heavy spring, or in using a chain or cable in conjunction with a turnbuckle, or a piston with a "floating circuit."

It is thus seen that the present invention provides a hydraulically operated tree-cutting device which can easily be mounted on the front end of a crawler-type tractor and which can utilize the existing hydraulic system of the tractor for both moving the blade and positioning the blade with respect to the tree to be cut. The special way in which this cutting unit is mounted permits the operator to approach very closely to a tree and to cut off the tree cleanly at virtually ground level regardless of the incline of the ground.

While the invention has been particularly described in connection with trees, it will be understood that it is also applicable to heavy brush and foliage that are not exactly classified as trees. Also, whereas the invention has been particularly described in relation to tractors, the invention could just as well be used with a number of other types of vehicles that are not strictly characterized as tractors.

In conclusion, while there has been illustrated and described some preferred embodiments of our invention, it is to be understood that since the various details of construction may obviously be varied considerably without really departing from the basic principles and teachings of this invention, we do not limit ourselves to the precise constructions herein disclosed and the right is specifically reserved to encompass all changes and modifications coming within the scope of the invention as defined in the appended claims. Having thus described our invention, what we now claim as new and desire to secure a United States Letters Patent on is set forth in the following claims.

What is claimed is:

1. An improved tree cutting device including:
   (a) a cutting blade,
   (b) one end of said cutting blade being pivotably mounted with respect to a pair of fixed jaw members,
   (c) fluid operated cylinder and piston means interconnecting said pair of jaw members and said cutting blade,
   (d) two generally parallel supporting arms having their rear ends adapted to be pivotably attached to a vehicle,
   (e) pivot means for pivotally interconnecting said two generally parallel supporting arms and said pair of fixed jaw members, so that said pair of fixed jaws can have limited pivotal movement about a horizontal axis,
   (f) flexible interconnection means interconnected between said two generally parallel supporting arms and said pair of fixed jaw members which serves to limit the pivotal arc through which the fixed jaw members can pivot.

2. An improved tree cutting device including:
   (a) a cutting blade,
   (b) one end of said cutting blade being pivotably mounted with respect to a pair of fixed jaw members,
   (c) fluid operated cylinder and piston means interconnecting said pair of jaw members and said cutting blade,
   (d) said fixed jaw members being mounted for vertical pivotal movement about an elongated horizontally disposed beam, and said fixed jaw members being additionally connected to said elongated horizontally disposed beam by flexible interconnection means so that said fixed jaw members are free to move through a limited pivotal arc,
   (e) two generally parallel supporting arms having their front ends attached to said beam and having their rear ends adapted to be pivotably attached to a vehicle, and
   (f) means for raising and lowering said beam.

3. An improved tree cutting device according to claim 2, wherein said flexible interconnection means comprises a cable.

4. An improved tree cutting device according to claim 2, wherein said flexible interconnection means comprises a chain.

5. A tree cutting device according to claim 2, wherein said means for raising and lowering said beam comprises a hydraulic cylinder and piston.

6. A tree cutting device according to claim 2, wherein said jaw members are provided with a plurality of teeth.

7. An improved tree cutting device according to claim 2, wherein said flexible interconnection means includes an upstanding post on said beam, a connection means on the top of said jaws, and a flexible element interconnecting said upstanding post and said connection means.

8. An improved tree cutting device according to claim 7, wherein said flexible element comprises a chain.

9. An improved tree cutting device according to claim 7, wherein said flexible element comprises a cable.

10. A tree cutting device according to claim 1, wherein said flexible interconnection means comprises an adjustable hydraulic cylinder.

References Cited

UNITED STATES PATENTS

| 2,214,334 | 9/1940 | Knight | 144—34 |
| 2,529,934 | 11/1950 | Gracey et al. | 144—34 |
| 2,565,252 | 8/1951 | McFaull | 144—34 |
| 2,697,459 | 12/1954 | McFaull | 144—34 |
| 3,057,599 | 10/1962 | Clatterbuck | 144—34 |
| 3,110,477 | 11/1963 | Campbell | 144—34 |

WILLIAM W. DYER, Jr., *Primary Examiner.*

W. D. BRAY, *Assistant Examiner.*